US012811270B2

(12) United States Patent
Yang

(10) Patent No.: US 12,811,270 B2
(45) Date of Patent: Nov. 24, 2026

(54) FOLDABLE RECEIVING ANTENNA AND FOLDABLE PANEL PROVIDED THEREWITH

(71) Applicant: Shenzhen Antop Technology Co., Ltd., Shenzhen (CN)

(72) Inventor: Ruidian Yang, Shenzhen (CN)

(73) Assignee: SHENZHEN ANTOP TECHNOLOGY CO., LTD., Shenzhen (CN)

( * ) Notice: Subject to any disclaimer, the term of this patent is extended or adjusted under 35 U.S.C. 154(b) by 83 days.

(21) Appl. No.: 18/913,756

(22) Filed: Oct. 11, 2024

(65) Prior Publication Data

US 2025/0316881 A1 Oct. 9, 2025

(30) Foreign Application Priority Data

Apr. 9, 2024 (CN) ........................ 202420724770.X

(51) Int. Cl.

*H01Q 1/08* (2006.01)
*H01Q 1/24* (2006.01)
*H01Q 9/28* (2006.01)

(52) U.S. Cl.

CPC ................. *H01Q 1/08* (2013.01); *H01Q 1/24* (2013.01); *H01Q 9/285* (2013.01)

(58) Field of Classification Search

CPC ............. H01Q 1/08; H01Q 1/24; H01Q 9/285
See application file for complete search history.

(56) References Cited

U.S. PATENT DOCUMENTS

| | | | | |
|---|---|---|---|---|
| 2021/0104582 | A1* | 4/2021 | Kim | H01Q 1/243 |
| 2022/0102864 | A1* | 3/2022 | Morimoto | H01Q 1/3291 |
| 2022/0229469 | A1* | 7/2022 | Cho | G06F 1/1641 |

* cited by examiner

*Primary Examiner* — Michael M Bouizza

(74) *Attorney, Agent, or Firm* — MUNCY, GEISSLER, OLDS & LOWE, P.C.

(57) ABSTRACT

A foldable receiving antenna has an antenna body which is divided into a plurality of folding units by at least one folding crease, wherein the antenna body has a plurality of layers, including a connecting layer spanning the folding crease for connecting adjacent two folding units, a centrally located support layer, a cover layer centrally symmetrically arranged at the both sides of the support layer, and an antenna layer disposed between the support layer and the cover layer. The foldable receiving antenna is free from large size and expensive pack and transport cost, inconvenient receiving direction of the antenna, and aesthetically unpleasing caused by thick thickness of the antenna mounted on an ultra-thin TV.

15 Claims, 5 Drawing Sheets

FOLDABLE RECEIVING ANTENNA AND FOLDABLE PANEL PROVIDED THEREWITH

CROSS REFERENCE TO RELATED APPLICATIONS

The present application claims priority from Chinese Application No. CN 202420724770.X filed on Apr. 9, 2024, all of which are hereby incorporated herein by reference.

TECHNICAL FIELD

The present disclosure relates to the technical field of flat panel antennas and, more specifically, to a foldable receiving antenna and a foldable panel provided therewith.

BACKGROUND

With the widespread use of wireless digital TV signals, the receiving directions of antennas of household users living in different parts of the city are different. Users want to receive TV program signals from transmission towers located in more different places. However, the original universal fixed receiving antennas are a bit difficult to meet this demand. In addition, ordinary household high-gain antennas are large in size and have high packaging and transportation costs. The existing receiving antennas installed on ultra-thin TVs are always barely satisfactory, which is not thin and lightweight enough, and not aesthetically pleasing, resulting in hardly meeting the ultimate needs of users.

To solve this problem, a foldable antenna product for ultra-thin TVs is designed. The folding effect can reduce packaging volume and thus greatly reduce transportation costs, and allow receiving signal of the antenna to be directly adjusted by changing the folding angle, thus improving convenience of automatic adjustment. In addition, thickness of the antenna can be compressed to the extreme, which can improve its application flexibility on ultra-thin TVs or other ultra-thin appliances and meets customers' aesthetic needs.

SUMMARY

The present disclosure provides a foldable receiving antenna and a foldable panel provided therewith, which is free from large size and expensive pack and transport cost, inconvenient receiving direction of the antenna, and aesthetically unpleasing caused by thick thickness of the antenna mounted on an ultra-thin TV.

In a first aspect, the present disclosure relates to a foldable receiving antenna, which includes a plurality of folding units divided by at least one folding crease. According to the present disclosure, the plurality of folding units have a plurality of layers, including a connecting layer spanning the folding crease for connecting the adjacent two folding units, a centrally located support layer, a cover layer centrally symmetrically arranged at the both sides the support layer, and an antenna layer disposed between the support layer and the cover layer.

The antenna in the present disclosure is divided into a plurality of folding units by the folding crease. In such case the antenna can be foldable, thereby reducing the packaging volume and transportation costs. In addition, the multi-layer structure of the folding units can reduce thickness of the antenna, thereby improving the appearance of the antenna installed on the ultra-thin TV. Further, without changing the stability of the folding unit, the arbitrary change of the extending angle can facilitate change of receiving angle of the antenna, making the antenna easy to receive signals. Particularly, structural support for the folding unit is provided by the support layer, it is advantageous that the antenna layer can be unfolded without deformation and thus the folding angle can be fixed to receive signals stably. With such configuration, the connection layer especially in form of a flexible layer can be directly connected with the antenna layer, which can avoid scratching of the antenna layer between the cover layer and support layer, thereby reducing the conductivity and service life of the antenna. With the outer protective layer of the folding unit through the cover layer, the folding antenna can be protected from damage caused by collision during transportation.

According to the present disclosure, the connecting layer is particularly a first connecting layer including a first upper connecting layer and a first lower connecting layer symmetrically stacked on the upper surface and the lower surface of the support layer respectively, the covering layer centrally is symmetrically attached on the outside surface of the first upper connecting layer and the first lower connecting layer, and the antenna layer is disposed between the first upper connecting layer and the support layer and/or between the first lower connecting layer and the support layer.

In this case, the first upper connecting layer and the first lower connecting layer connect the adjacent folding units on the upper and lower surfaces of the support layer respectively, in such way the flexible first upper connecting layer and first lower connecting layer alleviate extrusion from the covering layer during repeated folding of the antenna layer, thus protecting the antenna layer from being easily broken. The covering layer can protect the first upper connection layer and the first lower connection layer from damage caused by external collision during transportation. Moreover, it can flexibly meet different demands to the foldable antenna with changing the arrangement position of the antenna layer and the number of layers thereof.

In an alternative, the connecting layer works as the cover layer. In this case, the first connecting layer spans both sides of the folding crease and is attached to the outside surface of the support layer to form the covering layer.

With the first connecting layer made of flexible material used as the covering layer directly covering the upper and lower surfaces of the support layer, the covering layer is eliminated, thereby realizing ultra-thin effect of the folding antenna.

Preferably, the cover layer may be provided with at least one opening respectively aligned with the folding crease. In this case, the cover layer includes an upper cover layer and a lower cover layer centrally symmetrically overlaid on the upper surface and the lower surface of the support layer. The connecting layer refers to a second connecting layer including a second upper connecting layer and a second lower connecting layer symmetrically stacked on outside surface of the upper cover layer and the lower connecting layer, respectively. The antenna layer is disposed between the upper covering layer and the support layer and/or between the lower covering layer and the support layer.

Especially in the case of rigid covering layer, a loose folding space is formed by the opening and the folding crease. The upper covering layer and the lower covering layer protects the upper and lower surfaces of the support layer and the antenna layer is sandwiched therebetween. With the second connecting layer covered on the covering layer, a protective layer for the folding crease is formed and a cushion for multiple folding of the folding crease is provided, thus avoiding easy breakage of the antenna layer. Moreover, in such way it can flexibly meet different demands to the foldable antenna with changing the arrangement position of the antenna layer and the number of layers thereof.

Alternatively, the cover layer may work as the support layer. In this case, the cover layer is symmetrically overlaid on the upper and lower surfaces of the antenna layer to form the support layer.

In such way, the antenna layer can be integrally wrapped by the covering layer on both the upper and lower sides thereof, which can reduce filing of the support layer, with the covering layer acting directly as the support layer, thereby further reducing thickness of the folding antenna and thus increasing flexibility and adaptability of the folding antenna to the ultrathin television set.

Furthermore, in each suitable case, the cover layer in the present disclosure may be provided with a reinforcing edge at an edge thereof, which is formed by fusing the cover layer to the support layer or by fusing the two symmetrically cover layers attached on the outside surface of the upper connecting layer and the lower connecting layer.

On one hand, it is an easy and cost-saving way to form a reinforcing edge by directly fusing the cover layer with the support layer, or by directly fusing the two cover layers. On the other hand, the reinforcing edge of the cover layer can provide a cushion for extrusion or compression applied on the cover layer at the edges during folding, thereby releasing stress at the edges of the folding antenna, and thus enhancing service life of the folding antenna.

It is well known that the symmetric dipole antenna can achieve a wider operating bandwidth, farther extended frequency range, and also has a better-balanced radiation direction. Therefore, the antenna layer in the present disclosure is preferably a dipole antenna. The antenna layer particularly has a spreading angle ranging from 0° to 180°, so that the spreading angle of the antenna layer can be arbitrarily changed from 0° to 180°, thus improving stability of received signal.

In a second aspect, a foldable panel is further provided in the present disclosure, which has a long axis direction and a short axis direction, including the receiving antenna in each case mentioned above, wherein N+1 folding units and N folding creases (n being an integer greater than 0) are included, when N=1, only one folding crease is included, such the folding crease is disposed on a central axis of the long axis direction or the short axis direction; and the N folding creases are symmetrically disposed along the central axis in the long axis direction or the short axis direction when N>1.

In such configuration, at least two folding units can form a folding panel which is foldable in different directions. With the folding creases arranged along the central axis or symmetrically arranged relative to the central axis, the folding units can be all symmetrically foldable, which can better match the antenna, especially dipole antenna, in the antenna layer to enhance stability of receiving signals.

The N+1 folding units particularly includes a center folding unit and N symmetrical folding units, the area of the N symmetrical folding units after completely folded is preferably less than or equal to the area of the center folding unit.

In such configuration, after the symmetrical folding units are fully folded towards the center folding unit, all the symmetrical folding units are folded within the surface of the center folding unit, accordingly the maximum area of the foldable panel in folded state is the area of the center folding unit, which greatly reduces the installation volume of the folding antenna and transportation costs.

Preferably, at least one symmetrical folding unit is provided with a curved chamfer at the edge away from the center folding unit, and the center folding unit is provided with a curved inner concave at the central axis, the curved inner concave being aligned with the curved chamfer.

With the configuration of the curved chamfer, it can avoid formation of concentrated stress at the edge of the symmetrical folding unit during installation and transportation, and also avoids formation of charge aggregation at the tip of the antenna layer at the edge. In addition, the configuration of the curved inner concave aligned with the curved chamfer can further reduce the area of the folding antenna in folded state. With such easy way, the curved inner concave also facilitates installation of other stationary equipment or use of a device with a plurality of stacked foldable antennas.

The foldable antenna in the present disclosure achieves less packaging volume and transportation cost-saving. In addition, thickness of the antenna can be improved, and thus enhancing aesthetically pleasing of the antenna installed in the ultra-thin TV. According to the present disclosure, spreading angle of the antenna can be arbitrarily changed to adjust reception angle of the antenna for easily receiving signals, while ensuring stability of the folding units. The present disclosure also ensures that the antenna layer can be unfolded without deformation and the folding angle thus can be fixed to receive signals stably. Furthermore, the antenna layer in the present disclosure is free from scratching to improve conductivity and service life under protection of the covering layer. The foldable antenna of the present disclosure is also free from damage caused by collision during transportation.

Figure 1:
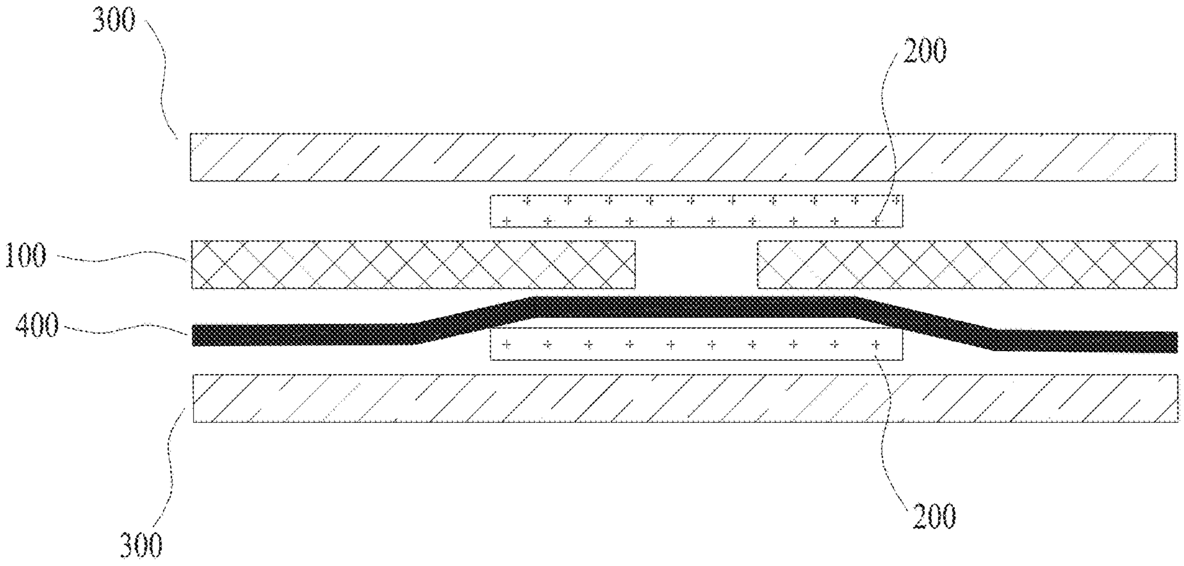
FIG. 1 shows a cross-sectional view of a foldable receiving antenna according to an embodiment of the present disclosure.

Reference signs: 10 folding unit, 20 folding crease, 100 support layer, 200 first connecting layer, 300 cover layer, 400 antenna layer, 310 opening, 500 second connecting layer.

DETAILED DESCRIPTION

The accompanying drawings of the present disclosure are for exemplary illustration only and are not to be construed as a limitation of the present disclosure. In order to better illustrate the following embodiments, certain parts of the accompanying drawings will be omitted, enlarged or reduced, and do not represent the dimensions of the actual product; for those skilled in the art, it is understandable that certain well-known structures and their descriptions in the accompanying drawings may be omitted.

A foldable receiving antenna is provided according to an embodiment of the present disclosure, which includes an antenna body, the antenna body is divided into a plurality of folding units 10 by at least one folding crease 20. The antenna body has a plurality of layers, including a connecting layer spanning the folding crease 20 for connecting the adjacent two folding units 10, a centrally located support layer 100, a cover layer 300 centrally symmetrically arranged at the both sides of the support layer 100, and an antenna layer 400 disposed between the support layer 100 and cover layer 300.

In this embodiment, the folding unit 10 of the multi-layer structure includes a connection layer, a support layer 100, a covering layer 300 and an antenna layer 400. The connection layer is used to connect each two adjacent folding units 10 on both sides of the folding crease 20, the support layer 100 is located in each of the two adjacent folding units 10 and is symmetrical along the center of the corresponding folding crease 20, the covering layer 300 is located on the outer surface of each folding unit 10 for wholly wrapping all the folding units 10 simultaneously. The antenna layer 400 is made of aluminum foil or silver paste, a thin layer sandwiched in the multilayer structure for receiving signals.

According to a preferable embodiment, the connecting layer refers to a first connecting layer 200 including a first upper connecting layer and a first lower connecting layer symmetrically stacked on the upper and lower surfaces of the support layer 100, respectively. In this case, the covering layer 300 is centrally symmetrically covered on the first upper connecting layer and under the first lower connecting layer, and the antenna layer 400 is disposed between the first upper connecting layer and the support layer 100 and/or between the first lower connecting layer and the support layer 100.

For example, in a case that the folding unit 10 is in the number of three, the folding creases 20 is in the number of two, and each folding crease 20 is provided between two adjacent folding units 10, the whole thickness of the folding antenna is the sum of thickness of the layers.

As shown in FIG. 1, the folding unit 10 has six layers, with the support layer 100 as the center layer, a layer of the first upper connecting layer and a layer of the first lower connecting layer symmetrically stacked on the upper surface of the support layer 100 and the lower surface of the support layer 100, respectively, the antenna layer 400 sandwiched between the first connecting layer 200 and the support layer 100, wherein the antenna layer 400 can be sandwiched between the support layer 100 and the first connecting layer 200 on the upper surface or lower surface thereof, or simultaneously sandwiched between the support layer 100 and the first connecting layer 200 on the upper and lower surfaces thereof, and the cover layer 300 symmetrically superimposed on the first upper connecting layer and the first lower connecting layer, respectively.

As an alternative, the connecting layer works as the cover layer 300. In this embodiment, the first connecting layer 200 spans both sides of the folding crease 20 and covers the upper surface of the support layer 100 and the lower surface of the support layer 100 to form the cover layer 300.

Figure 2:
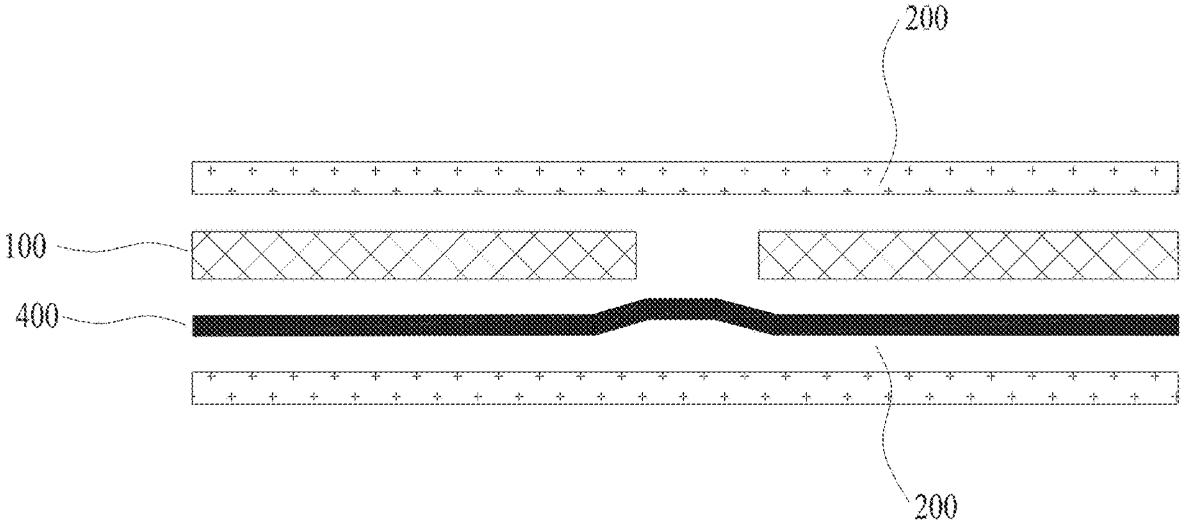
FIG. 2 shows a cross-sectional view of a foldable receiving antenna according to an alternative embodiment of the present disclosure.

Referring to FIG. 2, in an alternative embodiment, the first connecting layer 200 instead of the covering layer 300 is directly wrapped around the outside of the folding unit 10. The folding unit 10 in this embodiment has only four layers, with the support layer 100 as the center layer, one layer of the first connecting layer 200 symmetrically stacked on the upper and lower sides of the support layer 100, and the antenna layer 400 sandwiched between the support layer 100 and the first connecting layer 200 disposed on the upper or lower surface thereof, or simultaneously sandwiched between the support layer 100 and the first connecting layer 200 disposed on the upper and lower surfaces thereof.

In addition, the cover layer 300 may be provided with at least one opening 310 respectively aligned with the folding crease 20. In this case, the cover layer 300 includes an upper cover layer and a lower cover layer centrally symmetrically overlaid on the upper surface and the lower surface of the support layer 100, the connecting layer is a second connecting layer 500 including a second upper connecting layer and a second lower connecting layer symmetrically stacked on outside surface of the upper cover layer and the lower cover layer, respectively, and the antenna layer 400 is disposed between the upper covering layer and the support layer 100 and/or between the lower covering layer and the support layer 100.

Figure 3:
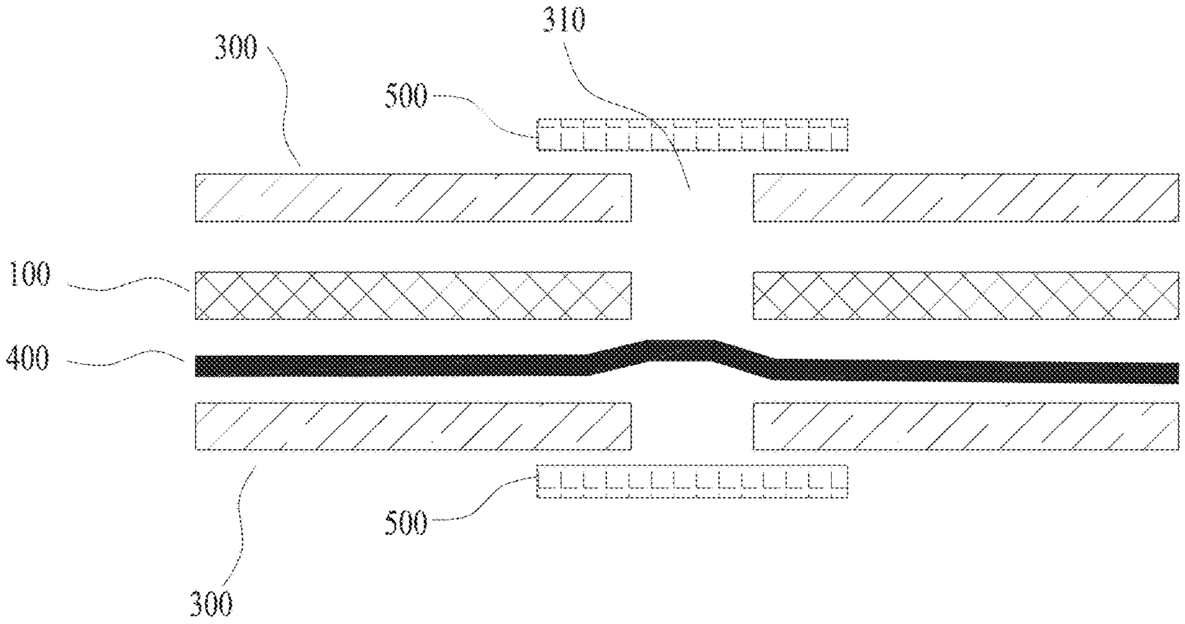
FIG. 3 shows a cross-sectional view of a foldable receiving antenna according to an embodiment of the present disclosure.

Referring now to FIG. 3, the folding unit 10 in this embodiment has six layers, with the support layer 100 as the center layer, one layer of the cover layer 300 symmetrically stacked on the upper and lower sides of the support layer 100, wherein each covering layer 300 has an opening 310 corresponding to the folding crease 20, and the opening 310 is covered with the second connecting layer, which second connecting layer 500 reinforces the sealing at the openings 310 for the folding crease 20, and the antenna layer 400 sandwiched between the support layer 100 and the covering layer 300.

In this embodiment, the opening 310 with a width of about 4 mm in the folding or unfolding direction is formed in the covering layer 300 corresponding to the folding crease 20, the cut of the opening 310 formed in the covering layer 300 is smooth without scraping the antenna layer 400. A thin and soft second connecting layer 500 is provided at the opening 310. The second connecting layer 500 is preferably a PVC material with thickness of about 0.1-0.2 mm.

In an alternative embodiment, the cover layer 300 works as the support layer 100. In this embodiment, the cover layer 300 is symmetrically overlaid on the upper and lower surfaces of the antenna layer 400 to form the support layer 100.

Figure 4:
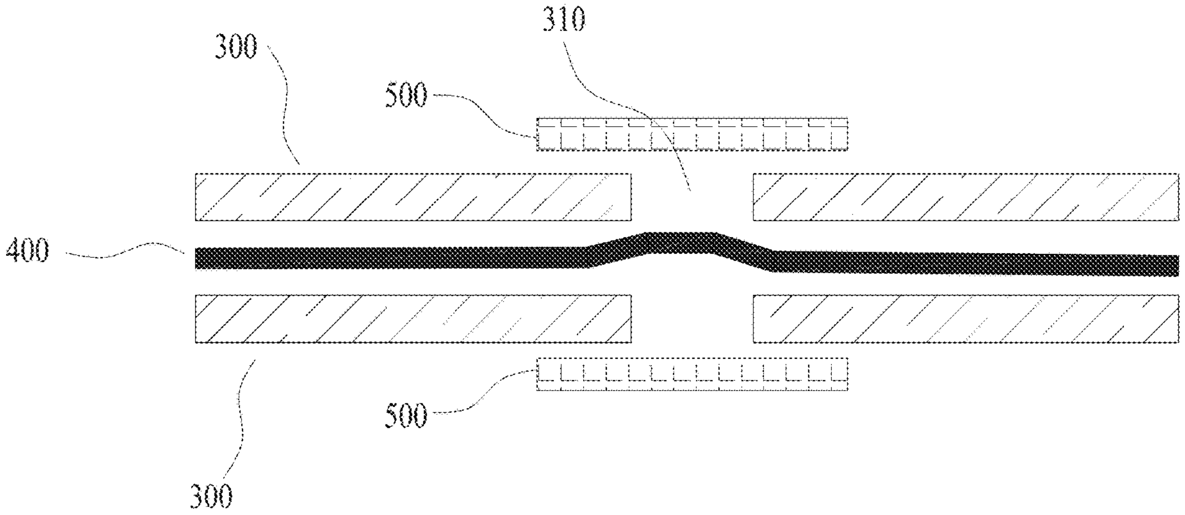
FIG. 4 shows a cross-sectional view of a foldable receiving antenna according to an alternative embodiment of the present disclosure.

As shown in FIG. 4, in order to reduce the whole thickness of the folding antenna, the support layer 100 is eliminated, and the cover layer 300 replaces the support layer 100 to serve to provide support. In this embodiment, the antenna layer 400 is sandwiched between the upper and lower layers of the cover layer 300. In this embodiment, the folding unit 10 has only four layers, wherein the covering layer 300 is symmetrically stacked on the upper and lower sides, respectively, the antenna layer 400 is sandwiched directly between the two layers of the covering layer 300, and the second connecting layer 500 is symmetrically stacked on the outside surface of the covering layer 300, respectively.

In addition, the cover layer 300 in each embodiment may be provided with a reinforcing edge 310, the reinforcing edge 310 being formed by fusing the cover layer 300 to the support layer 100 or by fusing the two cover layers 300.

The cover layer 300 and the support layer 100 are generally both harder baseplates with a thickness of about 0.3-0.5 mm. The reinforcing edge 310 processed by ultrasonic melting and pressing and with melting width of about 2 mm can ensure firmness of the antenna, which thus strengthens the sealing of the edges at the connection of the folding unit 10, and also strengthens the waterproofing effect of the folding unit 10.

The antenna layer 400 is preferably a dipole antenna, and the antenna layer 400 preferably has a spreading angle ranging from 0° to 180°.

The spreading angle of the antenna layer 400 is 0-180° arbitrary reception angle, which can effectively receive wireless electromagnetic wave signals transmitted from a television transmission tower to an indoor through arbitrary refraction and reflection. When the aluminum foil oscillator of the antenna is fully opened, i.e., the spreading angle of the antenna layer 400 is 180°, it is the most ideal state for the folding antenna to perform fixed-point transmission and reception test in the laboratory. The dipole antenna may use metals such as copper foil, silver paste, etc. as the vibrator conductor in addition to aluminum foil.

A foldable panel is further provided according to an embodiment of the present disclosure. The foldable panel has a long axis direction and a short axis direction and includes the foldable receiving antenna in each case mentioned above, wherein the number of folding unit 10 is N+1 and the number of the folding crease 20 is N (N being an integer greater than 0), when N=1, only one folding crease is included, such folding crease 20 is situated on the central axis in the long axis direction or the short axis direction, and the N folding creases 20 are symmetrically disposed along the central axis in the long axis or the short axis direction when N>1.

Particularly, when there are two folding units 10, only one folding crease 20 is included and is located on the central axis of the foldable panel, such that the foldable panel can be folded or unfolded symmetrically along the central axis. When there are three or more folding units 10, the foldable panel can be folded or unfolded along the folding crease 20 distributed symmetrically relative to the central axis.

Figure 5:
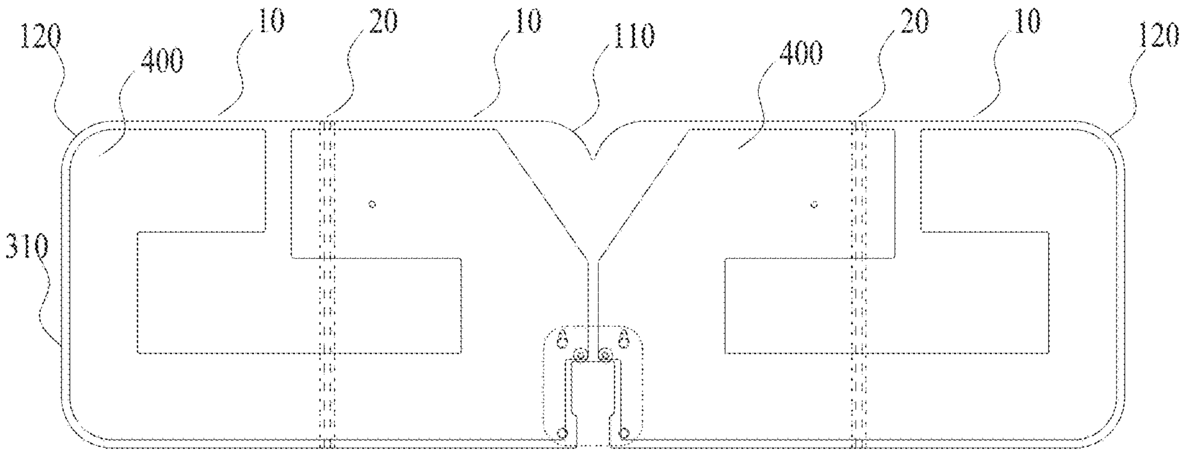
FIG. 5 shows a schematic diagram of a foldable panel according to an embodiment of the present disclosure.
Figure 6:
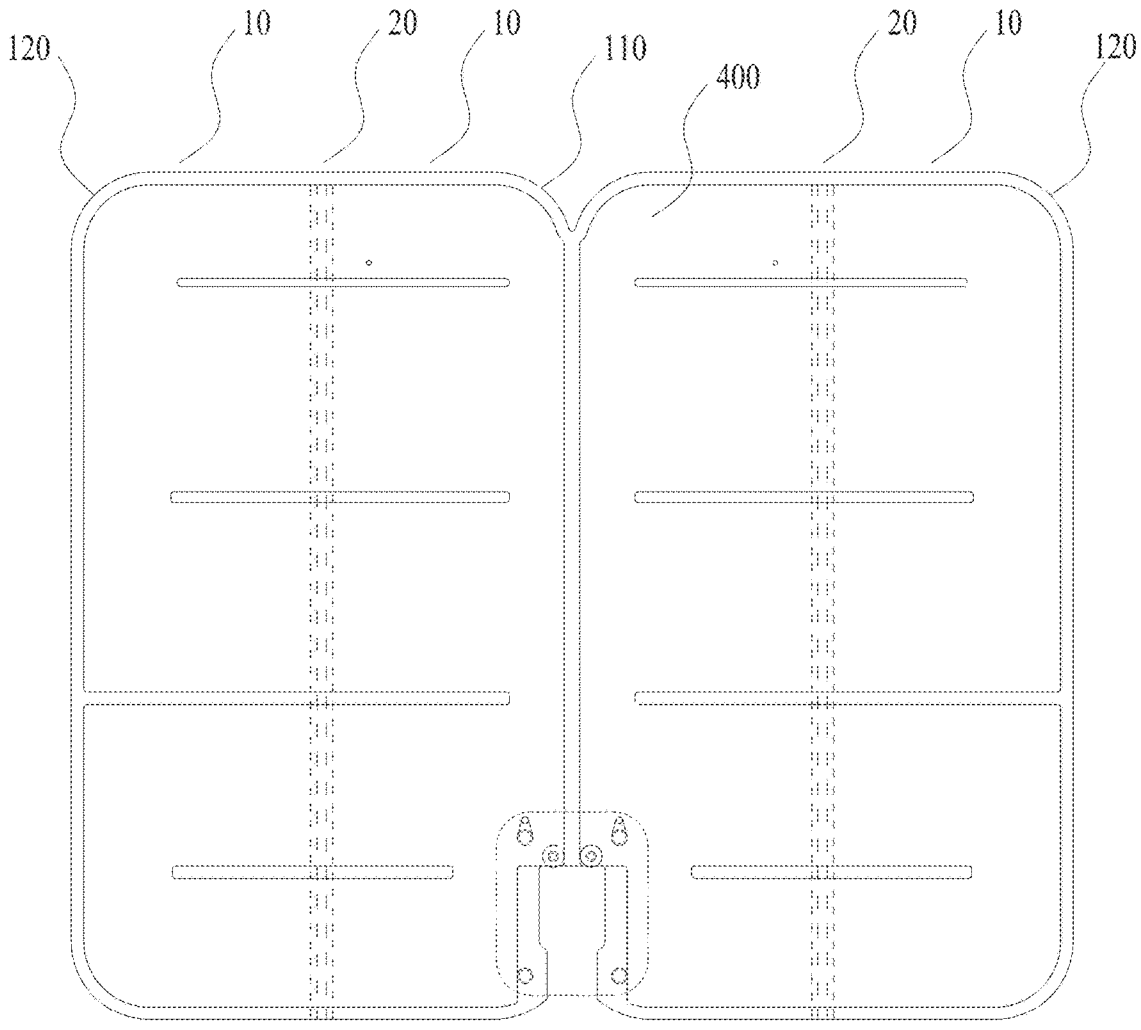
FIG. 6 shows a schematic view of a foldable panel according to an embodiment of the present disclosure.

In the embodiments shown in FIG. 5 and FIG. 6, N is 2 and three folding units 10 are included, the foldable panel can be symmetrically folded along the folding creases 20 in the short axis direction. The two folding creases 20 in this embodiment are symmetrically located on both sides of the central axis in the short axis direction. That is, the two folding creases 20 are symmetrical relative to the central axis in the short axis direction.

Figure 7:
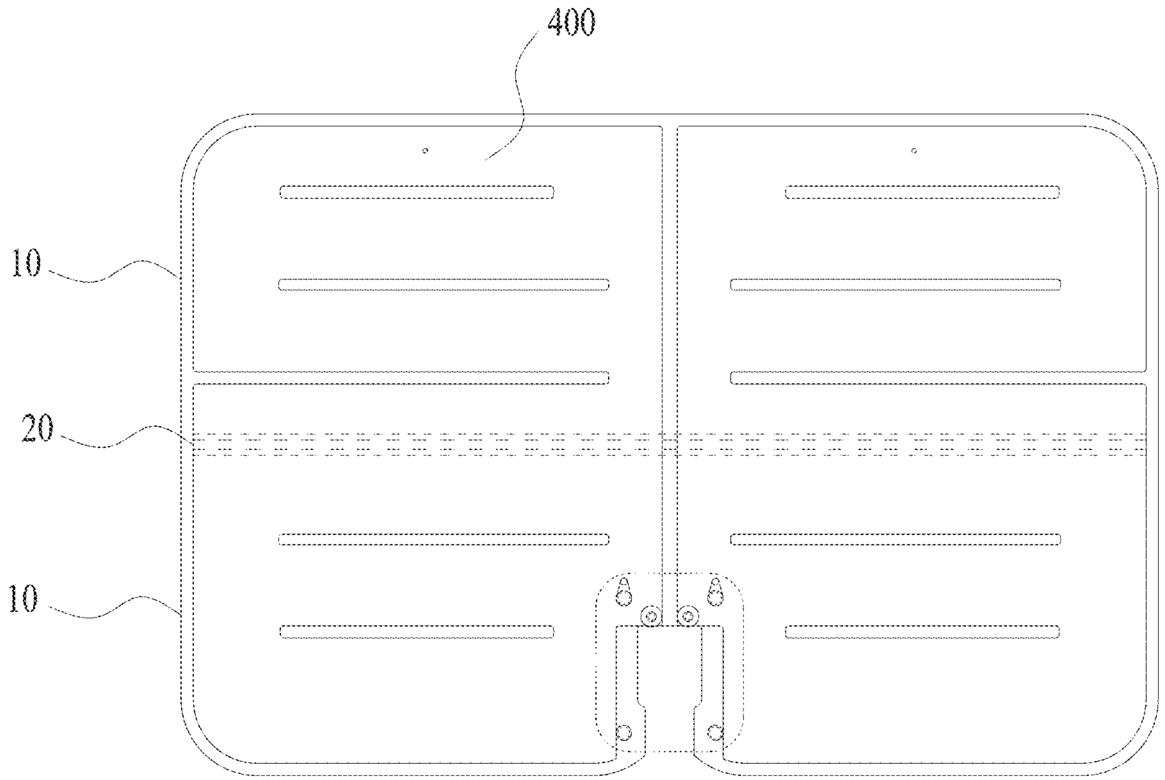
FIG. 7 shows a schematic view of a foldable panel according to an embodiment of the present disclosure.

In the embodiment shown in FIG. 7, N is 1 and two the folding units 10 are included, the foldable panel in this embodiment can be symmetrically folded along the central axis in the long axis direction. The folding crease 20 is located on the central axis of the folding unit.

Figure 8:
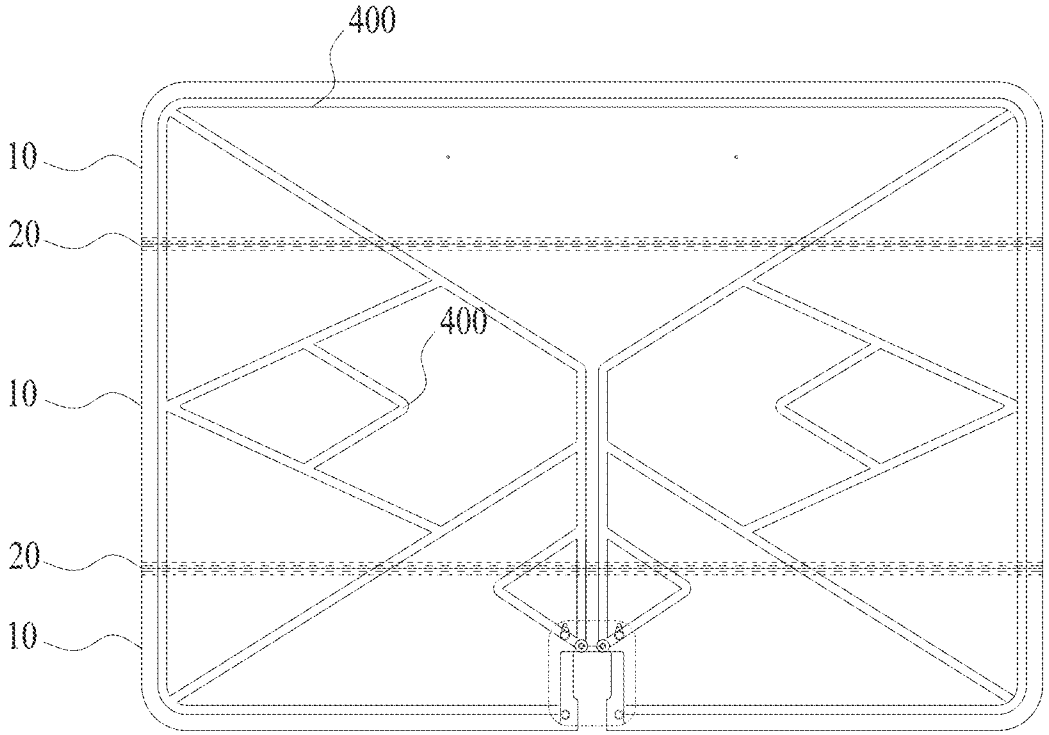
FIG. 8 shows a schematic view of a foldable panel according to an embodiment of the present disclosure.

In the embodiment shown in FIG. 8, N is 2 and three folding units 10 are included, the foldable panel can be symmetrically folded along the folding creases 20 in the long axis direction. The two folding creases 20 are located on both sides of the central axis in the long axis direction. That is, the two folding creases 20 in this embodiment are symmetrical relative to the central axis in the long axis direction.

The N+1 folding units particularly include one center folding unit 11 and N symmetrical folding units 12, according to a preferable embodiment, the area of the N symmetrical folding units 12 after completely folded is less than or equal to the area of the center folding unit 11.

Figure 9:
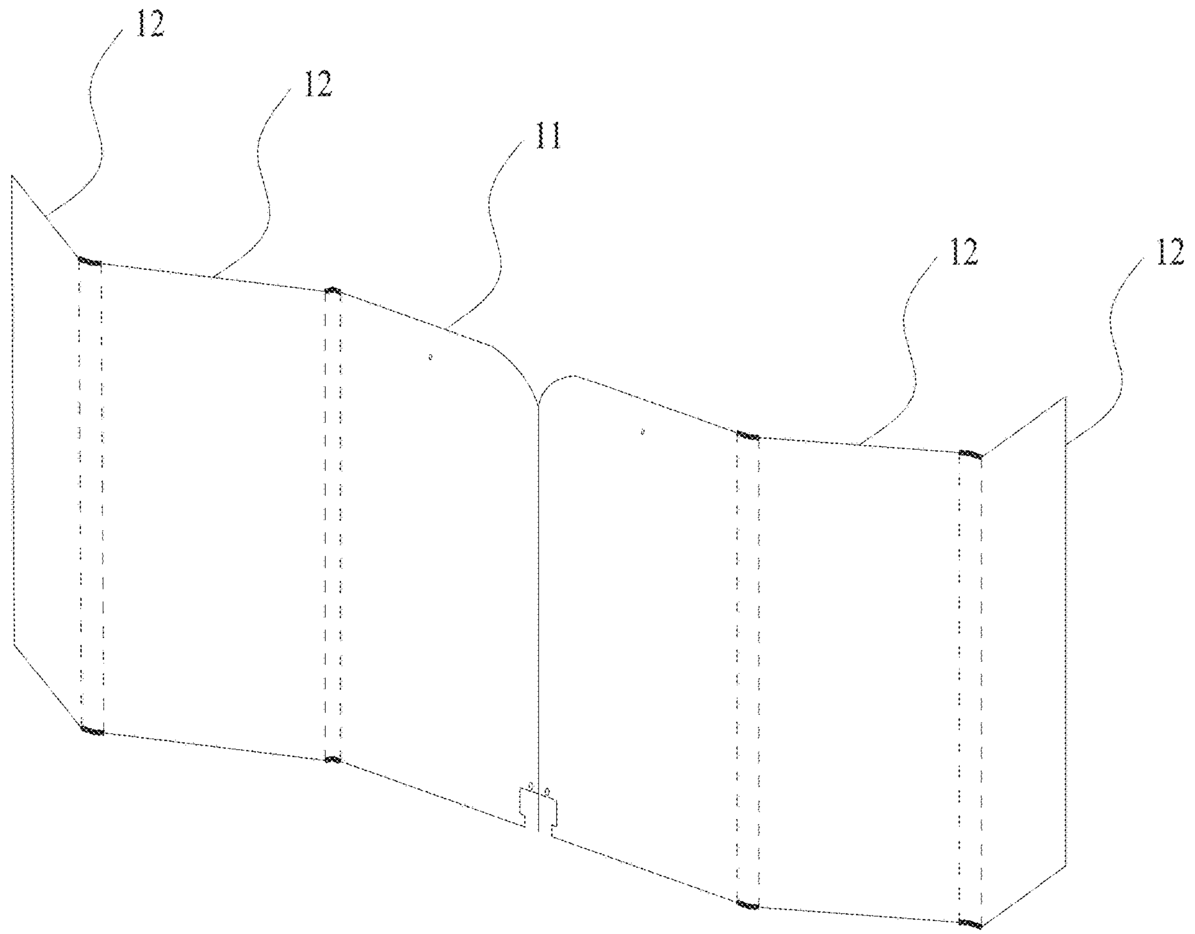
FIG. 9 shows a perspective view of a foldable panel according to an embodiment of the present disclosure, with a plurality of symmetrical folding units of varying areas.

Referring to FIG. 9, in this embodiment a plurality of the symmetrical folding units of varying areas are symmetrically distributed along the central axis of the short axis direction of the foldable panel, particularly one center folding unit and 4 symmetrical folding units are included, the 4 symmetrical folding units are symmetrically distributed relative to the center folding unit. In this embodiment the smallest area of the folding units after completely folded is equal to the area of the central folding unit. That is, the area of the foldable panel after fully folded is equal to the area of the central folding unit.

In addition, according to a preferable embodiment, at least one of the symmetrical folding units 12 is provided with a curved chamfer 120 at the edge thereof, and the center folding unit 11 is provided with an arcuate inner concave 110 at the central axis, the arcuate inner concave 110 being aligned with the curved chamfer 120.

Referring back to FIGS. 5 and 6, the two symmetrical folding units 12 are in rectangular shape, with the two corners near the outer edges chamfered, the upper edge of the center folding unit 11 is concave, especially in "V" shape, and the lower edge is used for connecting an external signal terminal. When the two symmetrical folding units 12 are folded, the curved chamfered corners of the symmetrical folding units 12 and the curved concave of the center folding unit 11 are aligned. In this embodiment, the curved chamfered corners of the symmetrical folding units 12 are entirely overlapped with the curved concave of the center folding unit 11.

Obviously, the above embodiments of the present disclosure are merely examples for the purpose of clearly illustrating the technical solution of the present disclosure, and are not intended to be a limitation of the specific embodiments of the present disclosure. Any modifications, equivalent substitutions and improvements made within the spirit and principles of the claims of the present disclosure shall be included in the scope of protection of the claims of the present disclosure.

What is claimed is:

1. A foldable receiving antenna, having an antenna body divided into a plurality of folding units by at least one folding crease, the folding units form non-folding areas, and the at least one folding crease forms folding areas, wherein the antenna body has a plurality of layers, including a connecting layer spanning the at least one folding crease for connecting adjacent two folding units, a centrally located support layer, two cover layers centrally symmetrically arranged at both sides of the support layer, and an antenna layer disposed between the support layer and one of the two cover layers, the antenna layer includes an antenna substantially extending over the plurality of folding units.

2. The foldable receiving antenna according to claim 1, wherein the connecting layer includes an upper connecting layer and a lower connecting layer symmetrically stacked on an upper surface and a lower surface of the support layer respectively, the two cover layers are centrally symmetrically attached on an outer surface of the upper connecting layer and the lower connecting layer, and the antenna layer is disposed between the upper connecting layer and the support layer and/or between the lower connecting layer and the support layer.

3. The foldable receiving antenna according to claim 2, wherein the upper connecting layer and the lower connecting layer span the at least one folding crease and are respectively attached to the upper surface and the lower surface of the support layer to form the two cover layers.

4. The foldable receiving antenna according to claim 2, wherein a reinforcing edge is provided at an edge of each cover layer, the reinforcing edge is formed by fusing the corresponding cover layer to the support layer or by fusing the two cover layers centrally symmetrically attached on the outer surface of the upper connecting layer and the lower connecting layer.

5. The foldable receiving antenna according to claim 1, wherein each cover layer is provided with an opening respectively aligned with the at least one folding crease, the two cover layers comprises an upper cover layer and a lower cover layer centrally symmetrically attached on an upper surface and a lower surface of the support layer respectively, the connecting layer comprises an upper connecting layer and a lower connecting layer symmetrically attached on an outer surface of the upper cover layer and the lower connecting layer, respectively, and the antenna layer is disposed between the upper cover layer and the support layer and/or between the lower cover layer and the support layer.

6. The foldable receiving antenna according to claim 5, wherein the two cover layers are symmetrically attached on an upper and lower surfaces of the antenna layer to form the support layer.

7. The foldable receiving antenna according to claim 5, wherein a reinforcing edge is provided at an edge of each cover layer, the reinforcing edge is formed by fusing the corresponding cover layer to the support layer or by fusing the two cover layers centrally symmetrically attached on the outer surface of the upper connecting layer and the lower connecting layer.

8. The foldable receiving antenna according to claim 1, wherein the antenna layer includes a dipole antenna, and the antenna layer has a spreading angle ranging from 0° to 180°.

9. A foldable panel, having a long axis direction and a short axis direction, comprising the receiving antenna according to claim 1, wherein N+1 folding units and N folding creases are included, in which N is an integer greater than 0, wherein when N=1, only one folding crease is included and such folding crease is disposed on a central axis of the long axis direction or the short axis direction, and the N folding creases are symmetrically disposed along the central axis in the long axis direction or the short axis direction when N>1.

10. The foldable panel according to claim 9, wherein the N+1 folding units comprise a center folding unit and N symmetrical folding units, a total area of the N symmetrical folding units after completely folded is less than or equal to an area of the center folding unit.

11. The foldable panel according to claim 10, wherein at least one of the N symmetrical folding units is provided with a curved chamfer at an edge away from the center folding unit, and the center folding unit is provided with a curved inner concave at the central axis, the curved inner concave being aligned with the curved chamfer.

12. The foldable panel according to claim 9, wherein the connecting layer includes an upper connecting layer and a lower connecting layer symmetrically stacked on an upper surface and a lower surface of the support layer respectively, the two cover layers are centrally symmetrically attached on an outer surface of the upper connecting layer and the lower connecting layer, and the antenna layer is disposed between the upper connecting layer and the support layer and/or between the lower connecting layer and the support layer.

13. The foldable panel according to claim 12, wherein the upper connecting layer and the lower connecting layer correspondingly span the N folding creases and are respectively attached to the upper surface and the lower surface of the support layer to form the two cover layers.

14. The foldable panel according to claim 9, wherein each cover layer is provided with an opening respectively aligned with the N folding creases, the two cover layers comprises an upper cover layer and a lower cover layer centrally symmetrically attached on an upper surface and a lower surface of the support layer respectively, the connecting layer comprises an upper connecting layer and a lower connecting layer symmetrically attached on an outer surface of the upper cover layer and the lower connecting layer, respectively, and the antenna layer is disposed between the upper cover layer and the support layer and/or between the lower cover layer and the support layer.

15. The foldable panel according to claim 14, wherein the two cover layers are symmetrically attached on an upper and lower surfaces of the antenna layer to form the support layer.

* * * * *